United States Patent
Christensen et al.

(10) Patent No.: US 9,504,240 B1
(45) Date of Patent: Nov. 29, 2016

(54) FISHING ROD HOLDER HAVING AUDIBLE STRIKE SIGNAL

(71) Applicants: Darwin Christensen, Tremonton, UT (US); Jeremy Christensen, Tremonton, UT (US)

(72) Inventors: Darwin Christensen, Tremonton, UT (US); Jeremy Christensen, Tremonton, UT (US)

(*) Notice: Subject to any disclaimer, the term of this patent is extended or adjusted under 35 U.S.C. 154(b) by 210 days.

(21) Appl. No.: 14/501,281

(22) Filed: Sep. 30, 2014

(51) Int. Cl.
*A01K 97/12* (2006.01)
*A01K 97/10* (2006.01)

(52) U.S. Cl.
CPC ............ *A01K 97/12* (2013.01); *A01K 97/10* (2013.01)

(58) Field of Classification Search
CPC ............................ A01K 97/12; A01K 97/10
USPC ................................. 43/17, 16, 21.2
See application file for complete search history.

(56) References Cited

U.S. PATENT DOCUMENTS

| | | | | |
|---|---|---|---|---|
| 374,737 A * | 12/1887 | Geils | ............. | A01K 97/01 43/16 |
| 467,120 A * | 1/1892 | Kunzel | ............. | A01K 97/125 43/17 |
| 467,123 A * | 1/1892 | Kunzel | ............. | A01K 97/125 43/17 |
| 935,877 A * | 10/1909 | Woesley | ............. | A01K 97/125 43/17 |
| 1,131,508 A * | 3/1915 | Hall | ............. | A01K 97/10 43/17 |
| 2,492,323 A * | 12/1949 | Roell | ............. | A01K 97/10 248/533 |
| 2,538,788 A * | 1/1951 | Massino | ............. | A01K 97/125 43/17 |
| 2,753,644 A * | 7/1956 | Abel | ............. | A01K 97/00 43/17 |
| 2,785,494 A * | 3/1957 | Eaton | ............. | A01K 97/125 43/17 |
| 2,856,144 A * | 10/1958 | Plater | ............. | A01K 97/10 248/533 |
| 2,921,399 A * | 1/1960 | Huliew | ............. | A01K 97/12 43/17 |
| 2,944,361 A | 7/1960 | Coulter | | |
| 3,020,664 A * | 2/1962 | Snyder | ............. | A01K 97/125 43/17 |
| 3,023,532 A * | 3/1962 | Gorenty | ............. | A01K 97/12 43/17 |
| 3,058,250 A * | 10/1962 | Thomas | ............. | A01K 97/10 43/17 |

(Continued)

FOREIGN PATENT DOCUMENTS

| | | | | |
|---|---|---|---|---|
| DE | 4219998 A1 * | 12/1993 | ............. | A01K 97/12 |
| FR | 2736799 A1 * | 1/1997 | ............. | A01K 89/08 |

(Continued)

*Primary Examiner* — Darren W Ark

(57) ABSTRACT

The fishing rod holder having audible strike signal is constructed of a pole configured to be inserted into a ground surface. A "V" member is affixed to a top pole distal end of the pole. The inner "V" member is further defined with an inner "V" armature that extends inwardly and is configured to engage both a fishing rod as well as a fishing line. The fishing rod is adapted to be leaned against the inner "V" armature when in fishing use. The inner "V" armature also includes a bell that rings when the fishing line is pulled. The "V" member also includes reflectors that are located adjacent the top "V" distal ends. The pole includes straps that are configured to secure the pole to a fishing rod when not in use.

7 Claims, 4 Drawing Sheets

(56) References Cited

U.S. PATENT DOCUMENTS

| | | | | |
|---|---|---|---|---|
| 3,115,722 A * | 12/1963 | Mann | A01K 97/10 | 43/21.2 |
| 3,453,767 A * | 7/1969 | Lake | A01K 97/125 | 43/17 |
| 3,628,275 A | 12/1971 | Howard | | |
| 3,698,116 A * | 10/1972 | Rosier | A01K 97/125 | 43/17 |
| 3,858,833 A * | 1/1975 | Fink | A01K 97/10 | 248/533 |
| 4,161,839 A * | 7/1979 | Ward | A01K 97/10 | 43/17 |
| 4,195,433 A * | 4/1980 | Engman | A01K 97/125 | 43/17 |
| 4,479,321 A * | 10/1984 | Welstead | A01K 97/125 | 43/17 |
| 4,479,628 A * | 10/1984 | Albright | A01K 97/10 | 43/21.2 |
| 4,581,838 A * | 4/1986 | Moon | A01K 97/10 | 43/17 |
| 4,763,435 A * | 8/1988 | Deering | A01K 97/10 | 43/21.2 |
| 4,837,965 A * | 6/1989 | True | A01K 97/01 | 43/17 |
| 5,349,775 A * | 9/1994 | Mondares | A01K 97/10 | 43/21.2 |
| 5,359,802 A | 11/1994 | Gutierrez | | |
| 5,488,798 A * | 2/1996 | Beachel | A01K 97/10 | 43/21.2 |
| D375,996 S | 11/1996 | Weatherman | | |
| 5,903,998 A | 5/1999 | Hawkins | | |
| 5,934,004 A * | 8/1999 | Koe | A01K 97/10 | 43/21.2 |
| 5,987,801 A * | 11/1999 | Anderson | A01K 97/01 | 43/17 |
| 6,646,557 B2 * | 11/2003 | Brake | A01K 97/125 | 43/17 |
| 6,817,136 B2 * | 11/2004 | Novak | A01K 97/10 | 43/21.2 |
| 6,931,782 B1 * | 8/2005 | Pitcock | A01K 97/08 | 43/21.2 |
| 7,827,729 B2 * | 11/2010 | Barnes | A01K 97/10 | 43/21.2 |
| D647,995 S * | 11/2011 | Kowalski | D22/147 | |
| 8,276,310 B1 | 10/2012 | Weber | | |
| 8,453,372 B1 * | 6/2013 | Moe | A01K 97/10 | 43/17 |
| 8,832,989 B2 * | 9/2014 | Martinella | A01K 97/01 | 43/16 |
| 8,931,203 B2 * | 1/2015 | Baugh | A01K 97/10 | 43/15 |
| 2008/0022577 A1 * | 1/2008 | Duggins | A01K 97/12 | 43/17 |
| 2008/0052981 A1 * | 3/2008 | Richardson | A01K 97/01 | 43/17 |
| 2010/0122487 A1 * | 5/2010 | Snider | A01K 97/10 | 43/21.2 |
| 2011/0154714 A1 * | 6/2011 | Rieck | A01K 97/10 | 43/21.2 |
| 2012/0204469 A1 * | 8/2012 | Kowalski | A01K 97/10 | 43/21.2 |
| 2016/0120161 A1 * | 5/2016 | Aiello | A01K 97/01 | 43/16 |

FOREIGN PATENT DOCUMENTS

| | | | | |
|---|---|---|---|---|
| FR | 2738714 A1 * | 3/1997 | | A01K 87/00 |
| GB | 2181932 A * | 5/1987 | | A01K 97/10 |
| JP | 2543820 | 7/1996 | | |
| JP | 2002054613 A * | 2/2002 | | |
| JP | 2003235425 A * | 8/2003 | | |

* cited by examiner

FISHING ROD HOLDER HAVING AUDIBLE STRIKE SIGNAL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of fishing accessories, more specifically, an accessory configured for use with a fishing rod in order to provide an audible strike signal when the fishing line is pulled.

SUMMARY OF THE INVENTION

The fishing rod holder having audible strike signal is constructed of a pole configured to be inserted into a ground surface. A "V" member is affixed to a top pole distal end of the pole. The "V" member is further defined with an inner "V" and an outer "V." The outer "V" is attached to the inner "V" at top "V" distal ends. The "V" member includes tension bands that attach to the inner "V" member as well as the outer "V" member. The tension bands enable the inner "V" member to rotate with respect to the outer "V" member. The inner "V" member is further defined with an inner "V" armature that extends inwardly and is configured to engage both a fishing rod as well as a fishing line. The fishing rod is adapted to be leaned against the inner "V" armature when in fishing use. The inner "V" armature also includes a bell that rings when the fishing line is pulled. The "V" member also includes reflectors that are located adjacent the top "V" distal ends. The pole includes straps that are configured to secure the pole to a fishing rod when not in use. The pole also includes measuring lines that are configured to measure a fish there along.

It is an object of the invention to provide a device that is configured to work with a fishing rod and fishing line in order to provide an audible and visible alert that a fishing line has been pulled.

These together with additional objects, features and advantages of the fishing rod holder having audible strike signal will be readily apparent to those of ordinary skill in the art upon reading the following detailed description of presently preferred, but nonetheless illustrative, embodiments of the fishing rod holder having audible strike signal when taken in conjunction with the accompanying drawings.

In this respect, before explaining the current embodiments of the fishing rod holder having audible strike signal in detail, it is to be understood that the fishing rod holder having audible strike signal is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fishing rod holder having audible strike signal.

It is therefore important that the claims be regarded as including such equivalent construction insofar as they do not depart from the spirit and scope of the fishing rod holder having audible strike signal. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
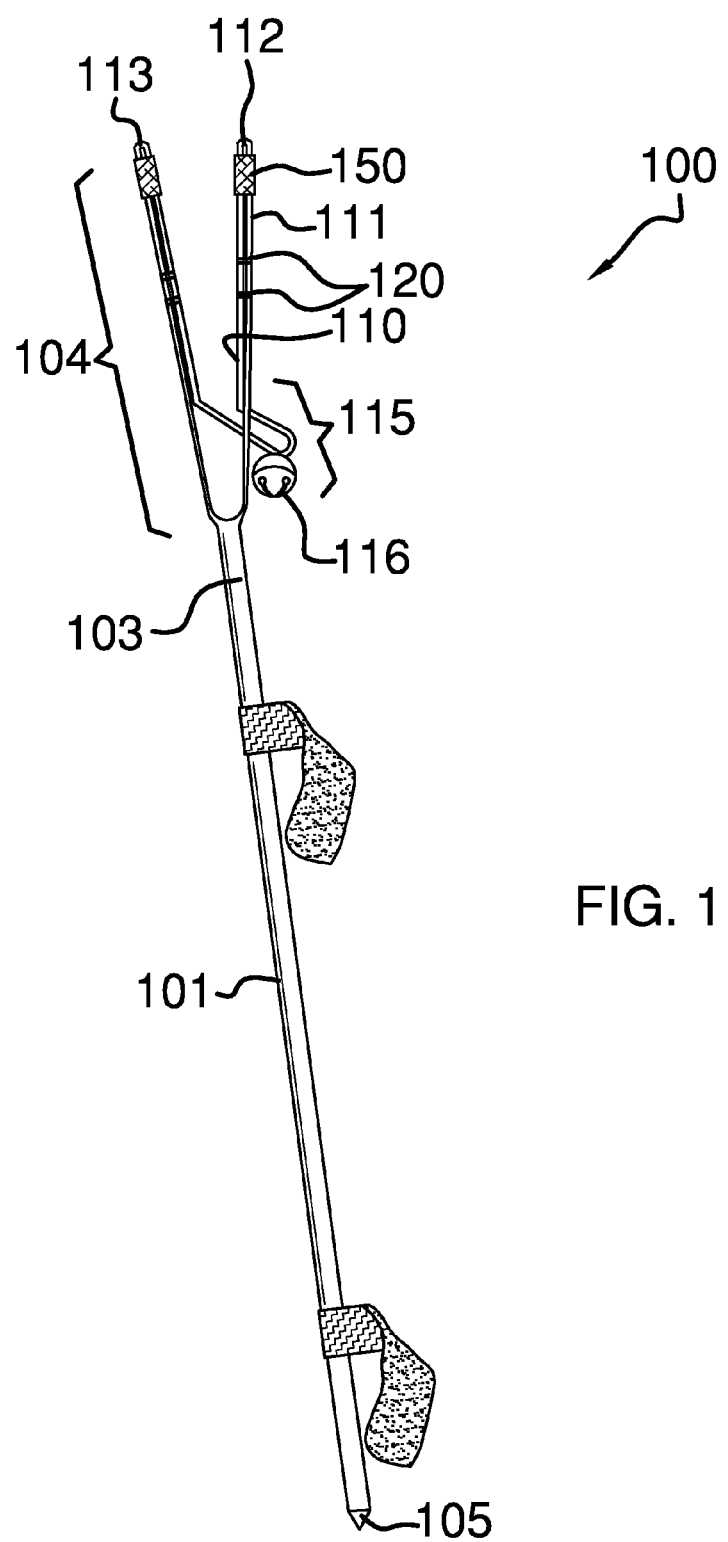
FIG. 1 illustrates a perspective view of an embodiment of the disclosure.
Figure 2:
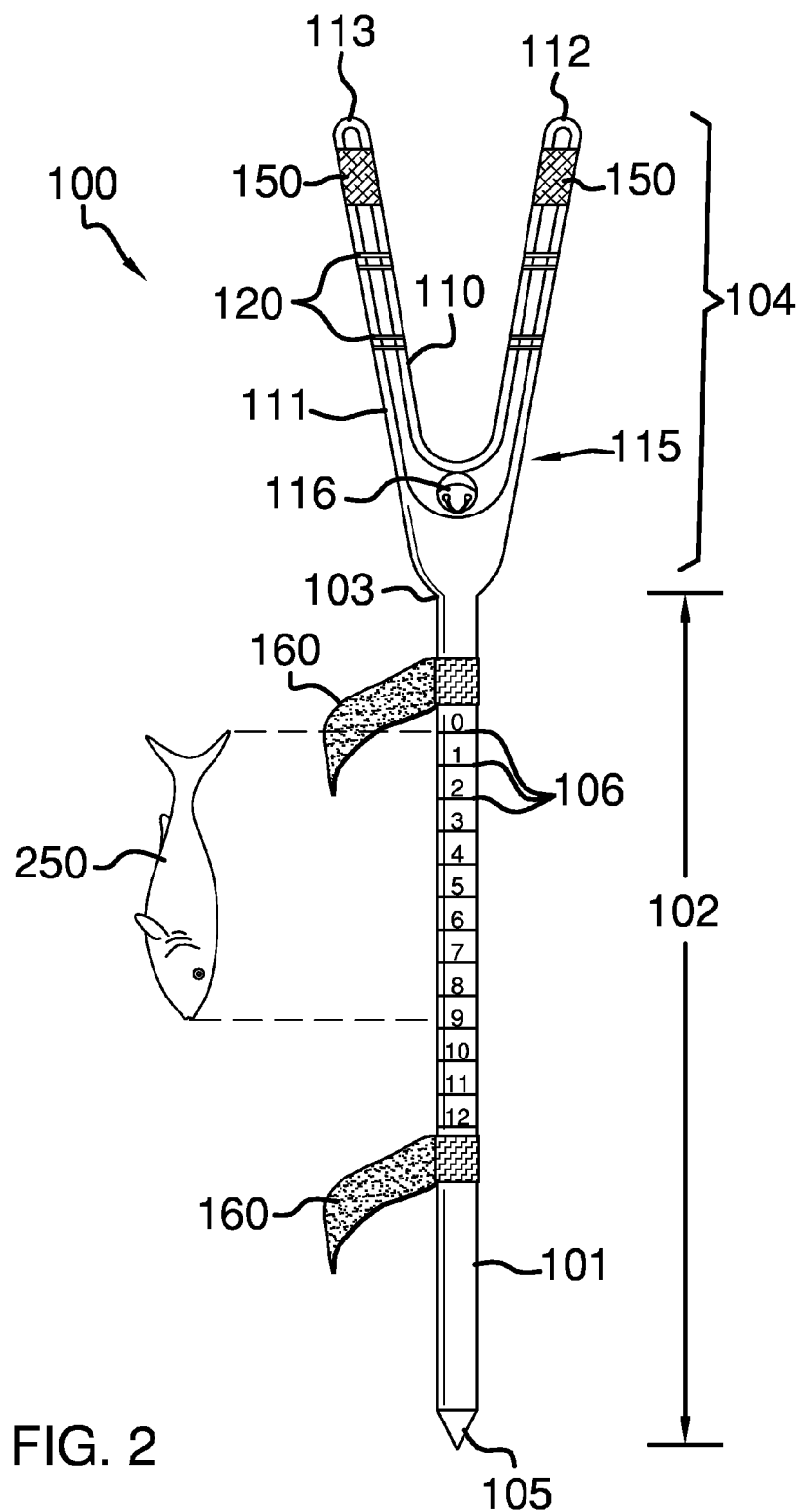
FIG. 2 illustrates a front view of an embodiment of the disclosure.
Figure 3:
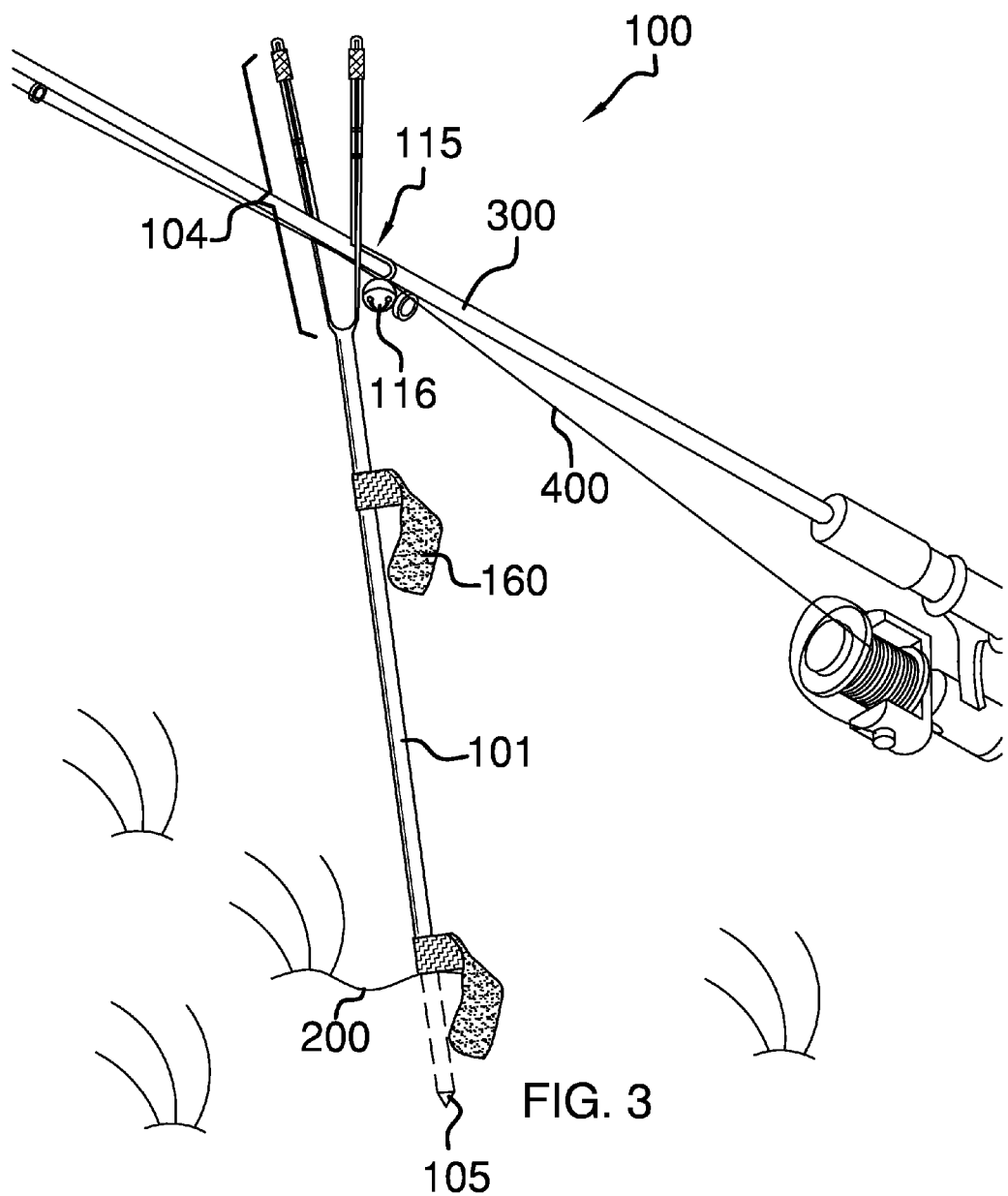
FIG. 3 illustrates a perspective view of an embodiment in use with a fishing rod and fishing line.
Figure 4:
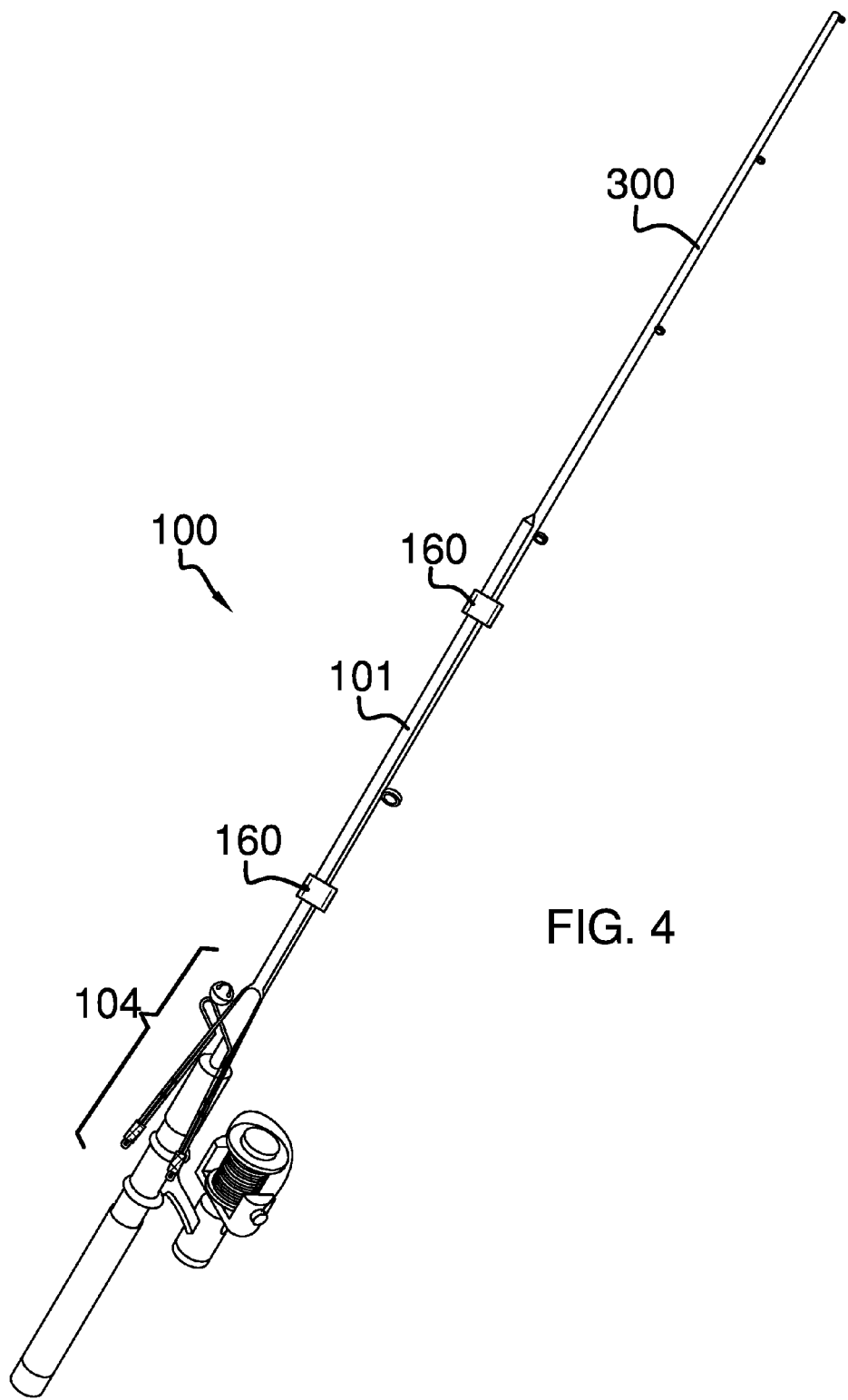
FIG. 4 illustrates another perspective view of an embodiment secured to a fishing rod when not in use.

Detailed reference will now be made to the preferred embodiment of the present invention, examples of which are illustrated in FIGS. 1-4. A fishing rod holder having audible strike signal 100 (hereinafter invention) is further defined with a pole 101 having a pole length 102. The pole 101 is further defined with a top pole distal end 103. A "V" member 104 is affixed to the top pole distal end 103. The pole 101 also includes a bottom pole distal end 105, which is pointed, and configured to be inserted into a ground surface 200. The pole 101 also includes measuring lines 106 along the pole length 102 in order to measure a fish 250 thereon.

The "V" member 104 is further defined with an inner "V" 110 and an outer "V" 111. The outer "V" 111 is attached to the inner "V" 110 at top "V" distal ends 112, 113. The "V" member 104 includes tension bands 120 that attach to the inner "V" member 110 as well as the outer "V" member 111 by extending around both the inner "V" member 110 and the outer "V" member 111. The tension bands 120 enable the inner "V" member 110 to rotate with respect to the outer "V" member 111. The inner "V" member 110 is further defined with an inner "V" armature 115 that extends inwardly and is configured to engage both a fishing rod 300 as well as a fishing line 400.

The fishing rod 300 is adapted to be leaned against the inner "V" armature 115 when in fishing use. The fishing rod 300 is adapted to rest against the inner "V" armature 115 of the "V" member 104.

Moreover, the fishing rod 300 touches the ground surface 200 as well as the inner "V" armature 115. The inner "V" armature 115 also includes a bell 116 that rings when the fishing line 400 is pulled. The bell 116 rings to provide an audible signal that the fishing line 400 has been pulled. The "V" member 104 also includes reflectors 150 that are located adjacent the top "V" distal ends 112, 113. The reflectors 150 are included on the "V" member 104 in order to provide a visual indication of movement of the invention 100 via the fishing line 400.

The pole 101 includes straps 160 that are configured to secure the pole 101 to the fishing rod 300 when not in use. Moreover, the straps 160 secure the invention 100 against the fishing rod 300 in parallel arrangement so as to fit compactly against the fishing rod 300 when both the invention 100 and the fishing rod 300 are not in use.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A fishing rod holder having audible strike signal comprising:
   a pole having a "V" member attached thereto;
   said "V" member is adapted to receive a fishing rod thereagainst;
   said "V" member includes a bell that rings when a fishing line is pulled on said fishing rod thereby providing an audible signal;
   wherein the pole is configured to be secured to a ground surface such that the fishing rod touches the ground surface when the fishing rod is received by the "V" member;
   said fishing rod is configured to lean against said "V" member when the fishing rod is received by the "V" member;
   wherein the pole is further defined with a pole length;
   wherein the pole is further defined with a top pole distal end;
   said "V" member is affixed to the top pole distal end;
   wherein the pole also includes a bottom pole distal end, which is pointed, and configured to be inserted into said ground surface;
   wherein the pole also includes measuring lines along the pole length in order to adaptively measure an object thereon;
   wherein the "V" member is further defined with an inner "V" and an outer "V";
   wherein the outer "V" is attached to the inner "V" at top "V" distal ends;
   wherein the "V" member includes tension bands that attach to the inner "V" as well as the outer "V" by extending around both the inner "V" and the outer "V";
   wherein the tension bands enable the inner "V" to rotate with respect to the outer "V";
   wherein the inner "V" is further defined with an inner "V" armature that extends inwardly and is configured to engage both said fishing rod as well as said fishing line when the fishing rod is received by the "V" member;
   wherein the inner "V" armature includes the bell located thereon.

2. The fishing rod holder having audible strike signal as described in claim 1 wherein the fishing rod is leaned against the inner "V" armature when in fishing use; wherein said fishing rod rests against the inner "V" armature of the "V" member when in fishing use.

3. The fishing rod holder having audible strike signal as described in claim 2 wherein the "V" member includes reflectors that are located adjacent the top "V" distal ends; wherein the reflectors are included on the "V" member in order to provide a visual indication of movement of the "V" member via the fishing line.

4. The fishing rod holder having audible strike signal as described in claim 3 wherein the pole includes straps that are configured to secure the pole to the fishing rod when not in use; wherein the straps are configured to secure the pole against the fishing rod in parallel arrangement so as to fit compactly against the fishing rod when both the fishing rod and the fishing rod holder having audible strike signal are not in use.

5. A fishing rod holder having audible strike signal comprising:
   a pole having a "V" member attached thereto;
   said "V" member is adapted to receive a fishing rod thereagainst;
   said "V" member includes a bell that rings when a fishing line is pulled on said fishing rod thereby providing an audible signal;
   wherein the pole is configured to be secured to a ground surface such that the fishing rod touches the ground surface when the fishing rod is received by the "V" member; said fishing rod is configured to lean against said "V" member when the fishing rod is received by the "V" member;
   wherein the pole is further defined with a pole length;
   wherein the pole is further defined with a top pole distal end; said "V" member is affixed to the top pole distal end;
   wherein the pole also includes a bottom pole distal end, which is pointed, and configured to be inserted into said ground surface;
   wherein the pole also includes measuring lines along the pole length in order to adaptively measure an object thereon;
   wherein the "V" member is further defined with an inner "V" and an outer "V"; wherein the outer "V" is attached to the inner "V" at top "V" distal ends; wherein the "V" member includes tension bands that attach to the inner "V" as well as the outer "V" by extending around both the inner "V" and the outer "V";
   wherein the tension bands enable the inner "V" to rotate with respect to the outer "V";

wherein the inner "V" is further defined with an inner "V" armature that extends inwardly and is configured to engage both said fishing rod as well as said fishing line when the fishing rod is received by the "V" member;

wherein the inner "V" armature includes the bell located thereon;

wherein the fishing rod leans against the inner "V" armature when in fishing use; wherein said fishing rod rests against the inner "V" armature of the "V" member when in fishing use.

6. The fishing rod holder having audible strike signal as described in claim 5 wherein the "V" member includes reflectors that are located adjacent the top "V" distal ends; wherein the reflectors are included on the "V" member in order to provide a visual indication of movement of the "V" member via the fishing line.

7. The fishing rod holder having audible strike signal as described in claim 6 wherein the pole includes straps that are configured to secure the pole to the fishing rod when not in use; wherein the straps are configured to secure the pole against the fishing rod in parallel arrangement so as to fit compactly against the fishing rod when both the fishing rod and the fishing rod holder having audible strike signal are not in use.

* * * * *